US012683731B2

(12) United States Patent
Jiang et al.

(10) Patent No.: US 12,683,731 B2
(45) Date of Patent: Jul. 14, 2026

(54) METHOD AND DEVICE IN NODES USED FOR WIRELESS COMMUNICATION ABOUT RADIO RESOURCE CONTROL LINK FAULURE

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 431 days.

(21) Appl. No.: 17/740,368

(22) Filed: May 10, 2022

(65) Prior Publication Data

US 2022/0368479 A1    Nov. 17, 2022

(30) Foreign Application Priority Data

May 12, 2021    (CN) .......................... 202110515236.9

(51) Int. Cl.
*H04L 5/00* (2006.01)

(52) U.S. Cl.
CPC .......... *H04L 5/0037* (2013.01); *H04L 5/0048* (2013.01); *H04L 5/006* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 10,686,573 B2 | 6/2020 | Jung et al. | |
| 12,016,013 B2 | 6/2024 | Wu et al. | |
| 2018/0278357 A1* | 9/2018 | Kim | H04J 11/0076 |
| 2019/0357292 A1* | 11/2019 | Cirik | H04W 76/19 |
| 2020/0059398 A1* | 2/2020 | Pan | H04W 72/21 |
| 2020/0137606 A1 | 4/2020 | Jiang et al. | |
| 2020/0260304 A1* | 8/2020 | Zhou | H04W 52/0235 |
| 2021/0022182 A1* | 1/2021 | Mondal | H04W 56/001 |
| 2021/0050968 A1 | 2/2021 | Yi et al. | |

(Continued)

OTHER PUBLICATIONS

Third Generation Partnership Project, "Technical Specification Group Radio Access Network; NR; Physical channels and modulation (Release 16)," 3GPP TS 38.211 V16.5.0 (Mar. 2021).

(Continued)

*Primary Examiner* — Diane L Lo
(74) *Attorney, Agent, or Firm* — Volpe Koenig

(57)    ABSTRACT
The present disclosure provides a method and device in a node used for wireless communications. A node first performs a channel measurement respectively on a first reference signal resource set and a second reference signal resource set, and both the first reference signal resource set and the second reference signal resource set comprise at least one reference signal resource; then as a response to K consecutive out-of-step(s), starts a first timer; and as a response to an expiry of the first timer, transmits a target message; a measurement performed on a target reference signal resource set is used to determine the K consecutive out-of-step(s), the target reference signal resource set is one of the first reference signal resource set and the second reference signal resource set. The application improves the method and device of M-TRP inter-cell mobility to optimize the system performance.

20 Claims, 4 Drawing Sheets

(56) References Cited

U.S. PATENT DOCUMENTS

| | | | |
|---|---|---|---|
| 2021/0051499 A1* | 2/2021 | Chen | H04W 80/08 |
| 2021/0058997 A1 | 2/2021 | Zhang et al. | |
| 2021/0266811 A1* | 8/2021 | Hwang | H04W 28/06 |
| 2022/0303847 A1* | 9/2022 | Wu | H04W 76/18 |
| 2023/0254712 A1 | 8/2023 | Li | |
| 2023/0284113 A1* | 9/2023 | Wu | H04W 36/18 |
| | | | 370/331 |
| 2023/0337020 A1* | 10/2023 | Da Silva | H04W 24/04 |

OTHER PUBLICATIONS

Third Generation Partnership Project, "Technical Specification Group Radio Access Network; NR; Physical channels and modulation (Release 17)," 3GPP TS 38.211 V17.1.0 (Dec. 2022).

Third Generation Partnership Project, "Technical Specification Group Radio Access Network; NR; Physical layer procedures for control (Release 16)," 3GPP TS 38.213 V16.5.0 (Mar. 2021).

Third Generation Partnership Project, "Technical Specification Group Radio Access Network; NR; Physical layer procedures for control (Release 17)," 3GPP TS 38.213 V17.1.0 (Mar. 2022).

Third Generation Partnership Project, "Technical Specification Group Radio Access Network; NR; Physical layer procedures for data (Release 16)," 3GPP TS 38.214 V16.5.0 (Mar. 2021).

Third Generation Partnership Project, "Technical Specification Group Radio Access Network; NR; Physical layer procedures for data (Release 17)," 3GPP TS 38.214 V17.1.0 (Mar. 2022).

Third Generation Partnership Project, "Technical Specification Group Radio Access Network; NR; Radio Resource Control (RRC) protocol specification (Release 16)," 3GPP TS 38.331 V16.4.1 (Mar. 2021).

Third Generation Partnership Project, "Technical Specification Group Radio Access Network; NR; Radio Resource Control (RRC) protocol specification (Release 17)," 3GPP TS 38.331 V17.0.0 (Mar. 2022).

* cited by examiner

Start

Step 101 preforming a channel measurement respectively on first reference signal resource set and second reference signal resource set Step 102 as response to K consecutive out-of-step(s) starting first timer, as response to expiry of the first timer transmitting target message End

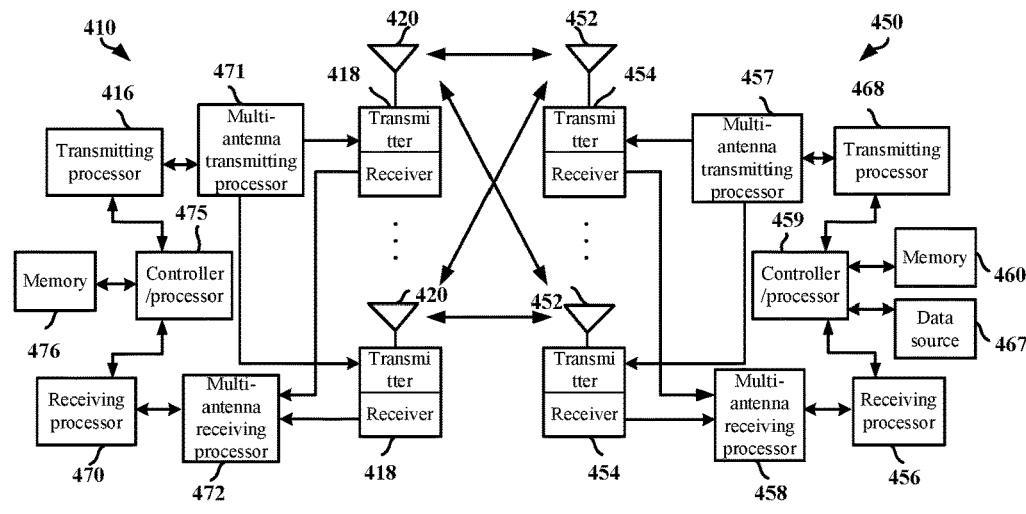

FIG. 4

| Second node N2 | | First node U1 |
| --- | --- | --- |

S20.transmitting a reference signal respectively in first reference signal resource set and second reference signal resource set ————reference signal————▶

S10.perfoming channel measurement respectively on first reference signal resource set and second reference signal resource set S11.as response to K consecutive out-of-step(s) starting first timer, as response to expiry of the first timer transmitting target message ◀————target message————

S21.receiving target message

End                                              End

FIG. 5

| Second node N4 | | First node U3 |
| --- | --- | --- |

S40.transmitting first message and second message

————first message and second message————▶

S30.receiving first message and second message

End                                              End

FIG.6

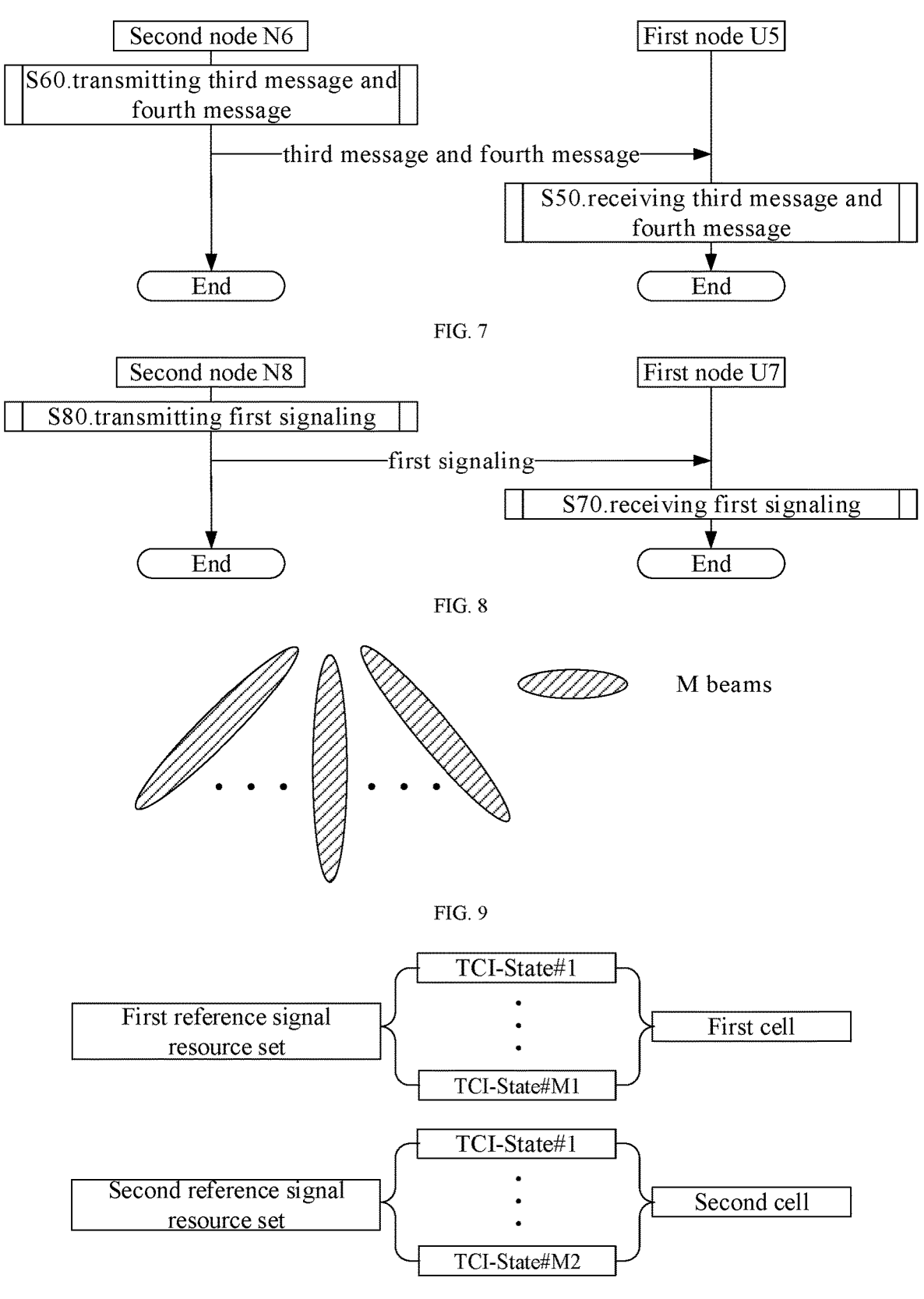

Second node N6

S60.transmitting third message and fourth message

————third message and fourth message————▶

First node U5

S50.receiving third message and fourth message

End

End

FIG. 7

Second node N8

S80.transmitting first signaling

————first signaling————▶

First node U7

S70.receiving first signaling

End

End

FIG. 8

M beams

FIG. 9

First reference signal resource set

TCI-State#1
⋮
TCI-State#M1

First cell

Second reference signal resource set

TCI-State#1
⋮
TCI-State#M2

Second cell

FIG. 10

METHOD AND DEVICE IN NODES USED FOR WIRELESS COMMUNICATION ABOUT RADIO RESOURCE CONTROL LINK FAULURE

CROSS REFERENCE TO RELATED APPLICATIONS

This application claims the priority benefit of Chinese Patent Application No. 202110515236.9, filed on May 12, 2021, the full disclosure of which is incorporated herein by reference.

BACKGROUND

Technical Field

The present disclosure relates to transmission methods and devices in wireless communication systems, and in particular to a design scheme and device of inter-cell mobility management in wireless communications.

Related Art

In 5G New Radio (NR), Massive Multi-Input Multi-Output (MIMO) is a key technology. In the massive MIMO, multiple antennas based on beamforming to form a relatively narrow beam which points to a particular direction to improve the quality of communication. In 5G NR, in addition to Radio Link Failure (RLF)-related operations, Beam Link Failure (BLF)-related operations are also defined to optimize beam selection and beam management in beamforming scenarios.

In the discussion of NR R17, for the scenario of Multi-TRP (transmitting and receiving node), issues related to inter-cell operations are under discussion. And in RAN1 #104b-e meeting, another extra Physical Cell Identifier (PCI) different from a PCI of a serving cell is introduced.

SUMMARY

Inventors have found through researches that the above extra PCI will be associated with one or a plurality of Transmission Configuration Indication (TCI) states for channel measurement. For the above extra PCI, one implementation method is that the above extra PCI is associated with a neighbor cell of a serving cell to implement that the terminal does not need to trigger handover when moving between the serving cell and the neighbor cell. While currently the terminal can only maintain a Radio Link Management (RLM) process in the serving cell instead of an RLM process in the neighbor cell; furthermore, under the existing protocol framework, when a serving cell is configured with a plurality of PCIs, reference signals corresponding to TCI states associated with those extra PCIs do not support a measurement performed on the RLM.

To address the above problem, the present disclosure provides a solution. It should be noted that although the above description uses massive MIMO and beam-based communication scenarios as examples, the application is also applicable to other scenarios, such as LIE multi-antenna systems, where similar technical effects can be achieved. Additionally, the adoption of a unified solution for various scenarios (including but not limited to massive MIMO, beam-based communications and LTE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

To solve the above problems, the present disclosure discloses a method and device for channel measurement and reporting under multi-TRP. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict. Further, though originally targeted at cellular network, the present disclosure is also applicable to Internet of Things (IoT) and Internet of Vehicles (IoV). Though originally targeted at multi-carrier communications, the present disclosure is also applicable to single-carrier communications. Though originally targeted at multi-antenna communications, the present disclosure is also applicable to single-antenna communications. Besides, the present disclosure is not only targeted at scenarios for terminals and base stations, but also at communication scenarios between terminals and terminals, terminals and relays, Non-Terrestrial Networks as well as relays and base stations, where similar technical effects can be achieved. Additionally, the adoption of a unified solution for various scenarios, including but not limited to communication scenarios between terminals and base stations, contributes to the reduction of hardware complexity and costs.

Further, embodiments in a first node in the present disclosure and characteristics of the embodiments may be applied to a second node if no conflict is incurred, and vice versa. Particularly, for interpretations of the terminology, nouns, functions and variants (if not specified) in the present disclosure, refer to definitions given in Technical Specification (TS) 36 series, TS38 series and TS37 series of 3GPP specifications.

The present disclosure provides a method in a first node for wireless communications, comprising:

performing a channel measurement respectively on a first reference signal resource set and a second reference signal resource set, the first reference signal resource set comprising at least one reference signal resource, the second reference signal resource set comprising at least one reference signal resource; and as a response to K consecutive out-of-step(s), starting a first timer; and as a response to an expiry of the first timer, transmitting a target message;

herein, a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate a Radio Resource Control (RRC) link failure.

In one embodiment, one technical feature of the above method is in: the first node simultaneously maintains a channel measurement based on the first reference signal resource set and a channel measurement based on the second reference signal resource set, where the channel measurement based on the second reference signal resource set is used to determine whether an RLF occurs in a serving cell, and the channel measurement based on the first reference signal resource set is used to determine whether a beam for a neighbor cell needs to be replaced to implement an inter-cell mobility management without triggering an HO.

In one embodiment, another technical feature of the above method is in: when the target reference signal resource set is the first reference signal resource set, the first node determines a TCI associated with a neighbor cell that needs to be updated by transmitting the target message to network side, so as to ensure that the first node can be moved to a new neighbor cell to serve.

According to one aspect of the present disclosure, only when the target reference signal resource set is the second reference signal resource set, the target message comprises an RRC-layer signaling.

In one embodiment, one technical feature of the above method is in: when the target reference signal resource set is the first reference signal resource set, the first node implements an inter-cell mobility management by transmitting a physical-layer or Medium Access Control (MAC)-layer signaling to improve the update speed.

According to one aspect of the present disclosure, any reference signal resource in the first reference signal resource set is associated with a first cell, and any reference signal resource in the second reference signal resource set is associated with a second cell.

In one embodiment, one technical feature of the above method is in: the first reference signal resource set and the second reference signal resource are respectively associated with a neighbor cell and a serving cell.

According to one aspect of the present disclosure, comprising:

receiving a first message and a second message;

herein, the first message and the second message respectively indicate K1 and K2, and K1 and K2 are respectively positive integers; when the target reference signal resource set is the first reference signal resource set, K is K1; and when the target reference signal resource set is the second reference signal resource set, K is K2.

According to one aspect of the present disclosure, comprising:

receiving a third message and a fourth message;

herein, the third message and the fourth message respectively indicate a first time length and a second time length; when the target reference signal resource set is the first reference signal resource set, an expiration value of the first timer is the first time length; and when the target reference signal resource set is the second reference signal resource set, an expiration value of the first timer is the second time length.

According to one aspect of the present disclosure, comprising:

receiving a first signaling, the first signaling being used to indicate a first time-frequency resource set;

herein, the target message is transmitted in the first time-frequency resource set; a demodulation reference signal of a channel occupied by the first signaling and a third reference signal resource are quasi co-located, and the third reference signal resource is different from any reference signal resource comprised in the first reference signal resource set.

According to one aspect of the present disclosure, the third reference signal resource is associated with the first cell and the second cell at the same time.

In one embodiment, one technical feature of the above method is in: a beam corresponding to the third reference signal resource can be maintained by the first cell and the second cell at the same time, so as to ensure that the first node can receive the first signaling, thus determining time-frequency resources occupied by transmitting the target message.

The present disclosure provides a method in a second node for wireless communications, comprising:

transmitting a reference signal respectively in a first reference signal resource set and a second reference signal resource set, the first reference signal resource set comprising at least one reference signal resource, the second reference signal resource set comprising at least one reference signal resource; and receiving a target message;

herein, a transmitter of the target message is a first node, the first node performs a channel measurement respectively on a first reference signal resource set and a second reference signal resource set, and a measurement performed on a target reference signal resource set is used to determine the K consecutive out-of-step(s); as a response to the K consecutive out-of-step(s), the first node starts a first timer; and as a response to an expiry of the first timer, the first node transmits a target message; the target reference signal resource set is one of the first reference signal resource set and the second reference signal resource set; only when the target reference signal resource set is the second reference signal resource set, the target message is used to indicate an RRC link failure.

According to one aspect of the present disclosure, only when the target reference signal resource set is the second reference signal resource set, the target message comprises an RRC-layer signaling.

According to one aspect of the present disclosure, any reference signal resource in the first reference signal resource set is associated with a first cell, and any reference signal resource in the second reference signal resource set is associated with a second cell.

According to one aspect of the present disclosure, comprising:

transmitting a first message and a second message;

herein, the first message and the second message respectively indicate K1 and K2, and K1 and K2 are respectively positive integers; when the target reference signal resource set is the first reference signal resource set, K is K1; and when the target reference signal resource set is the second reference signal resource set, K is K2.

According to one aspect of the present disclosure, comprising:

transmitting a third message and a fourth message;

herein, the third message and the fourth message respectively indicate a first time length and a second time length; when the target reference signal resource set is the first reference signal resource set, an expiration value of the first timer is the first time length; and when the target reference signal resource set is the second reference signal resource set, an expiration value of the first timer is the second time length.

According to one aspect of the present disclosure, comprising:

transmitting a first signaling, the first signaling being used to indicate a first time-frequency resource set;

herein, the target message is transmitted in the first time-frequency resource set; a demodulation reference signal of a channel occupied by the first signaling and a third reference signal resource are quasi co-located, and the third reference signal resource is different from any reference signal resource comprised in the first reference signal resource set.

According to one aspect of the present disclosure, the third reference signal resource is associated with the first cell and the second cell at the same time.

The present disclosure provides a first node for wireless communications, comprising:

a first receiver, performing a channel measurement respectively on a first reference signal resource set and a second reference signal resource set, the first reference signal resource set comprising at least one reference signal resource, the second reference signal resource set comprising at least one reference signal resource; and a first transmitter, as a response to K consecutive out-of-step(s), starting a first timer; and as a response to an expiry of the first timer, transmitting a target message;

herein, a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

The present disclosure provides a second node for wireless communications, comprising:

a second transmitter, transmitting a reference signal respectively in a first reference signal resource set and a second reference signal resource set, the first reference signal resource set comprising at least one reference signal resource, the second reference signal resource set comprising at least one reference signal resource; and a second receiver, receiving a target message;

herein, a transmitter of the target message is a first node, the first node performs a channel measurement respectively on a first reference signal resource set and a second reference signal resource set, and a measurement performed on a target reference signal resource set is used to determine the K consecutive out-of-step(s); as a response to the K consecutive out-of-step(s), the first node starts a first timer; and as a response to an expiry of the first timer, the first node transmits a target message; the target reference signal resource set is one of the first reference signal resource set and the second reference signal resource set; only when the target reference signal resource set is the second reference signal resource set, the target message is used to indicate an RRC link failure.

In one embodiment, the present disclosure has the following advantages over conventional schemes:

the first node simultaneously maintains a channel measurement based on the first reference signal resource set and a channel measurement based on the second reference signal resource set, where the channel measurement based on the second reference signal resource set is used to determine whether an RLF occurs in a serving cell, and the channel measurement based on the first reference signal resource set is used to determine whether a beam for a neighbor cell needs to be replaced to implement an inter-cell mobility management without triggering an HO;

when the target reference signal resource set is the first reference signal resource set, the first node determines a TCI associated with a neighbor cell that needs to be updated by transmitting the target message to network side, so as to ensure that the first node can be moved to a new neighbor cell to serve;

when the target reference signal resource set is the first reference signal resource set, the first node implements an inter-cell mobility management by transmitting a physical-layer or MAC-layer signaling to improve the update speed;

the first reference signal resource set and the second reference signal resource are respectively associated with a neighbor cell and a serving cell, so as to realize an inter-cell mobility management without triggering an HO;

a beam corresponding to the third reference signal resource can be maintained by the first cell and the second cell at the same time, so as to ensure that the first node can receive the first signaling, thus determining time-frequency resources occupied by transmitting the target message.

BRIEF DESCRIPTION OF THE DRAWINGS

Other features, objects and advantages of the present disclosure will become more apparent from the detailed description of non-restrictive embodiments taken in conjunction with the following drawings:

FIG. 4 illustrates a schematic diagram of a first communication device and a second communication device according to one embodiment of the present disclosure;

FIG. 5 illustrates a flowchart of a target message according to one embodiment of the present disclosure;

FIG. 6 illustrates a flowchart of a first massage and a second message according to one embodiment of the present disclosure;

FIG. 7 illustrates a flowchart of a third massage and a fourth message according to one embodiment of the present disclosure;

FIG. 8 illustrates a flowchart of a first signaling according to one embodiment of the present disclosure;

FIG. 9 illustrates a schematic diagram of a target reference signal resource set according to one embodiment of the present disclosure;

FIG. 10 illustrates a schematic diagram of a first reference signal resource set and a second reference signal resource set according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
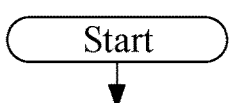
FIG. 1 illustrates a flowchart of the processing of a first node according to one embodiment of the present disclosure.

Embodiment 1 illustrates a processing flowchart of a first node, as shown in FIG. 1. In step 100 illustrated by FIG. 1, each box represents a step. In embodiment 1, a first node in the present disclosure performs a channel measurement respectively on a first reference signal resource set and a second reference signal resource set in step 101; in step 102 starts a first timer as a response to K consecutive out-of-step(s), and transmits a target message as a response to an expiry of the first timer.

In embodiment 1, the first reference signal resource set comprises at least one reference signal resource, the second reference signal resource set comprises at least one reference signal resource; a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

In one embodiment, the first reference signal resource set comprises M1 reference signal resource(s), M1 being a positive integer.

In one subembodiment of the above embodiment, M1 is equal to 1.

In one subembodiment of the above embodiment, M1 is greater than 1.

In one subembodiment of the above embodiment, any of the M1 candidate reference signal resource(s) comprises a Channel State Information-Reference Signal (CSI-RS) resource.

In one subembodiment of the embodiment, any of the M1 candidate reference signal resource(s) comprises a Demodulation Reference Signal (DMRS) resource.

In one subembodiment of the embodiment, any of the M1 candidate reference signal resource(s) comprises a Sounding Reference Signal (SRS) resource.

In one subembodiment of the above embodiment, any of the M1 candidate reference signal resource(s) comprises a Synchronization Signal/physical broadcast channel Block (SSB).

In one subembodiment of the embodiment, any of the M1 candidate reference signal resource(s) corresponds to a TCI.

In one subembodiment of the embodiment, any of the M1 candidate reference signal resource(s) corresponds to a TCI-State.

In one subembodiment of the embodiment, any of the M1 candidate reference signal resource(s) corresponds to a TCI-StateId.

In one embodiment, the first reference signal resource set comprises M2 reference signal resource(s), M2 being a positive integer.

In one subembodiment of the above embodiment, M2 is equal to 1.

In one subembodiment of the above embodiment, M2 is greater than 1.

In one subembodiment of the embodiment, any of the M2 candidate reference signal resource(s) comprises a CSI-RS resource.

In one subembodiment of the embodiment, any of the M2 candidate reference signal resource(s) comprises a DMRS resource.

In one subembodiment of the embodiment, any of the M2 candidate reference signal resource(s) comprises an SRS resource.

In one subembodiment of the embodiment, any of the M2 candidate reference signal resource(s) comprises an SSB.

In one subembodiment of the embodiment, any of the M2 candidate reference signal resource(s) corresponds to a TCI.

In one subembodiment of the embodiment, any of the M2 candidate reference signal resource(s) corresponds to a TCI-State.

In one subembodiment of the embodiment, any of the M2 candidate reference signal resource(s) corresponds to a TCI-StateId.

In one embodiment, M1 in the present disclosure is equal to M2 in the present disclosure.

In one embodiment, the channel measurement comprises a Reference Signal Received Power (RSRP) measurement.

In one embodiment, the channel measurement comprises a Reference Signal Receiving Quality (RSRQ) measurement.

In one embodiment, the channel measurement comprises a Signal to Interference Plus Noise Ratio (SINR) measurement.

In one embodiment, the channel measurement comprises a Block Error Rate (BLER) calculation.

In one embodiment, the channel measurement comprises reception performance determined based on a hypothetical reception of a Physical Downlink Control Channel (PDCCH).

In one embodiment, K is a positive integer.

In one embodiment, K is a positive integer greater than 1.

In one embodiment, K is equal to N310 in TS 38.331.

In one embodiment, K is equal to n310 in TS 38.331.

In one embodiment, the meaning of the K consecutive out-of-step(s) includes: K consecutive "out-of-sync(s)".

In one embodiment, the meaning of the K consecutive out-of-step(s) includes: receiving an indication of K consecutive "out-of-sync(s)" of a source Special Cell (SpCell) from a lower layer, and T304 being running.

In one embodiment, the meaning of the K consecutive out-of-step(s) includes: receiving an indication of K consecutive "out-of-sync(s)" of a source SpCell from a lower layer, and T300, T301, T304, T311, T316 and T319 being not running.

In one embodiment, the first timer is T310.

In one embodiment, the meaning of the starting a first timer includes: starting a first timer for a source Spcell.

In one embodiment, the meaning of the starting a first timer includes: starting a first timer for a corresponding Spcell.

In one embodiment, the meaning of the above phrase of "as a response to an expiry of the first timer, transmitting a target message" includes: if the first timer is kept in a Master Cell group (MCG), and if Access Stratum (AS) security is not activated, entering into RRC_IDLE; or initiating an MCG failure information process, or connecting a reestablishment process, when any DAPS bearer is configured.

In one embodiment, the meaning of the above phrase of "as a response to an expiry of the first timer, transmitting a target message" includes: if the first timer is kept in a Secondary Cell Group (SCG), informing E-UTRAN/NR an RLF about the SCG by initiating an SCG failure information process.

In one embodiment, the target reference signal resource set is the first reference signal resource set.

In one embodiment, the target reference signal resource set is the second reference signal resource set.

In one embodiment, the meaning of the above phrase of "performing a channel measurement respectively on a first reference signal resource set and a second reference signal resource set" includes: when a serving cell of the first node is configured with a plurality of Bandwidth Parts (BWPs), the first node executes an RLM on an activated BWP by adopting RS(s) corresponding to a resource index provided by a RadioLinkMonitoringRS; and when a RadioLinkMonitoringRS is not provided on an activated BWP, the first node executes an RLM by adopting RS(s) provided by an activated TCI state in Control Resource Sets (CORESETs) receiving a PDCCH on an activated BWP.

In one subembodiment of the embodiment, the RadioLinkMonitoringRS is used to indicate at least one of the first reference signal resource set or the second reference signal resource set.

In one subembodiment of the embodiment, at least one of the first reference signal resource set or the second reference signal resource set comprises RS(s) corresponding to a resource index provided by the RadioLinkMonitoringRS.

In one subembodiment of the embodiment, at least one of the first reference signal resource set or the second reference signal resource set comprises RS(s) provided by an activated TCI state in the CORESETs.

In one embodiment, the meaning of the above phrase of "performing a channel measurement respectively on a first reference signal resource set and a second reference signal resource set" includes: in non-DRX mode operation, a physical layer of the first node evaluates a radio link quality each indication period, evaluates a threshold ($Q_{out}$ and $Q_{in}$) violating a rlmInSyncOutOfSyncThreshold configuration in a past time period, and the first node determines that an indication period is a maximum value between a shortest periodic radio link monitoring resource and 10 ms.

In one embodiment, the meaning of the above phrase of "performing a channel measurement respectively on a first reference signal resource set and a second reference signal resource set" includes: in Discontinuous Reception (DRX) mode operation, a physical layer of the first node evaluates a radio link quality each indication period, evaluates a threshold ($Q_{out}$ and $Q_{in}$) violating a rlmInSyncOutOfSyncThreshold configuration in a past time period, and the first node determines that an indication period is a maximum value between a shortest periodic radio link monitoring resource and a DRX cycle.

In one embodiment, the meaning of the above phrase of "performing a channel measurement respectively on a first reference signal resource set and a second reference signal resource set" includes: when radio link qualities of resources in all resource sets used for a radio link monitoring are worse than $Q_{out}$ threshold, a physical layer of the first node indicates "out-of-sync" to a higher layer in those frames whose radio link quality is evaluated; and when a radio link quality of resources in any resource set used for radio link monitoring is better than $Q_{in}$ threshold, a physical layer of the first node indicates "in-sync" to a higher layer in those frames whose radio link quality is evaluated.

In one embodiment, the meaning of the above phrase of "performing a channel measurement respectively on a first reference signal resource set and a second reference signal resource set" includes: performing a channel measurement based on a reference signal transmitted in the first reference signal resource set.

In one embodiment, the meaning of the above phrase of "performing a channel measurement respectively on a first reference signal resource set and a second reference signal resource set" includes: performing a channel measurement based on a radio signal transmitted in the first reference signal resource set.

In one embodiment, the meaning of the above phrase of "performing a channel measurement respectively on a first reference signal resource set and a second reference signal resource set" includes: performing a channel measurement based on a reference signal transmitted in the second reference signal resource set.

In one embodiment, the meaning of the above phrase of "performing a channel measurement respectively on a first reference signal resource set and a second reference signal resource set" includes: performing a channel measurement based on a radio signal transmitted in the second reference signal resource set.

In one embodiment, the meaning of the phrase of the target message being used to indicate an RRC link failure includes: the target message comprises a RRCConnectionReestablishmentRequest.

In one embodiment, the meaning of the phrase of the target message being used to indicate an RRC link failure includes: the target message comprises a RRCReestablishmentRequest.

In one embodiment, the meaning of the phrase of the target message being used to indicate an RRC link failure includes: the target message comprises SCGFailureInformation.

In one embodiment, the meaning of the phrase of the target message being used to indicate an RRC link failure includes: the target message comprises MCGFailureInformation.

In one embodiment, the first reference signal resource set comprises M1 reference signal resource(s), and the second reference signal resource set comprises M2 reference signal resource(s).

In one subembodiment of the embodiment, any of the M1 reference signal resource(s) is different from any of the M2 reference signal resource(s).

In one subembodiment of the embodiment, there at least exists one of the M1 reference signal resource(s) being different from any of the M2 reference signal resource(s).

In one subembodiment of the embodiment, there at least exists one of the M2 reference signal resource(s) being different from any of the M1 reference signal resource(s).

In one embodiment, the meaning of the above phrase of performing a channel measurement respectively on a first reference signal resource set and a second reference signal resource set includes: performing a channel measurement based on a reference signal transmitted in the first reference signal resource set, and performing a channel measurement based on a reference signal transmitted in the second reference signal resource set.

In one embodiment, the RLM in the present disclosure also comprises a Radio Link Monitoring.

Embodiment 2

Figure 2:
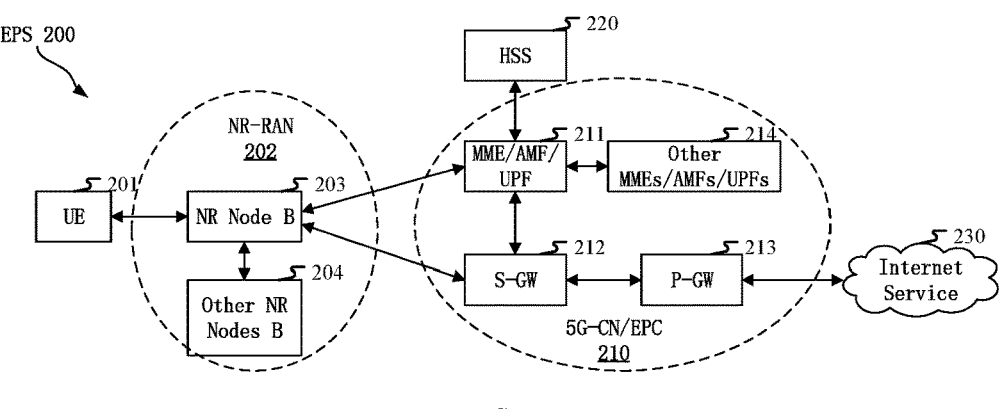
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 can receive PDCCHs from a plurality of TRPs at the same time.

In one embodiment, the UE 201 can receive CSI-RSs from a plurality of TRPs at the same time.

In one embodiment, the UE 201 can receive SSBs from a plurality of TRPs at the same time.

In one embodiment, the UE 201 is a terminal capable of monitoring a plurality of beams at the same time.

In one embodiment, the UE 201 is a terminal supporting Massive-MIMO.

In one embodiment, the UE 201 is a terminal supporting Vehicle-to-Everything (V2X).

In one embodiment, the gNB 203 corresponds to the second node in the present disclosure.

In one embodiment, the gNB 203 can transmit PDCCHs from a plurality of TRPs at the same time.

In one embodiment, a plurality of TRPs comprised in the gNB 203 can transmit CSI-RSs at the same time.

In one embodiment, a plurality of TRPs comprised in the gNB 203 can transmit SSBs at the same time.

In one embodiment, the gNB 203 supports a multi-beam transmission.

In one embodiment, the gNB 203 supports Massive-MIMO based transmission.

In one embodiment, the gNB 203 comprises at least two TRPs.

In one embodiment, at least two TRPs comprised in the gNB 203 are connected through an ideal backhaul

Embodiment 3

Figure 3:
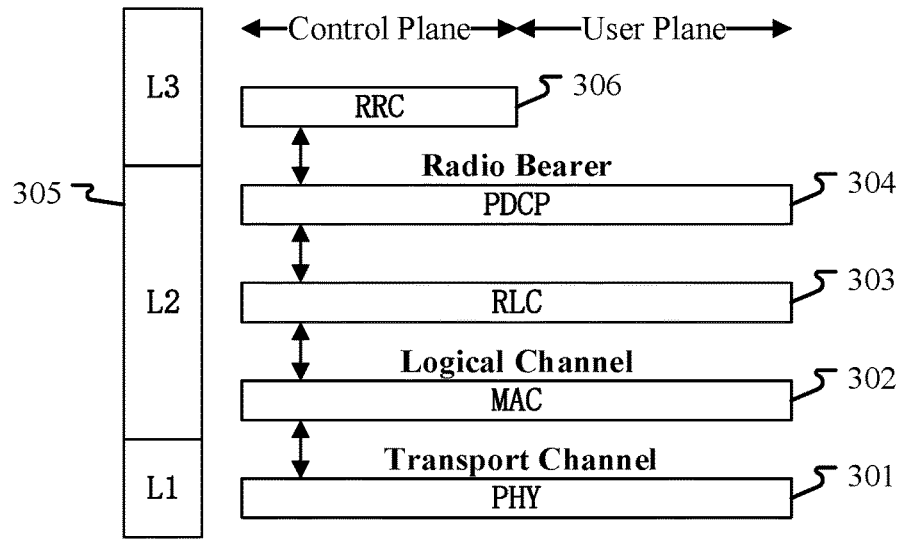
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used to schedule scheduling of the first communication node.

In one embodiment, the PDCP 354 of the second communication node is used to generate scheduling of the first communication node.

In one embodiment, the first reference signal resource set and the second reference signal resource set in the present disclosure are generated by the MAC 302 or the MAC 352.

In one embodiment, a radio signal transmitted in the first reference signal resource set and a radio signal transmitted in the second reference signal resource set in the present disclosure are generated by the MAC 302 or the MAC 352.

In one embodiment, the first reference signal resource set and the second reference signal resource set in the present disclosure are generated by the RRC 306.

In one embodiment, a radio signal transmitted in the first reference signal resource set and a radio signal transmitted in the second reference signal resource set in the present disclosure are generated by the RRC 306.

In one embodiment, the first reference signal resource set and the second reference signal resource set in the present disclosure are generated by the PHY 301 or the PHY 351.

In one embodiment, a radio signal transmitted in the first reference signal resource set and a radio signal transmitted in the second reference signal resource set in the present disclosure are generated by the PHY 301 or the PHY 351.

In one embodiment, the first timer in the present disclosure is maintained by the MAC 302 or the MAC 352.

In one embodiment, the first timer in the present disclosure is maintained by the RRC 306.

In one embodiment, the target message in the present disclosure is generated in PHY 301 or PHY 351.

In one embodiment, the target message in the present disclosure is generated by the MAC 302 or the MAC 352.

In one embodiment, the target message in the present disclosure is generated by the RRC 306.

In one embodiment, the first message in the present disclosure is generated by the MAC 302 or the MAC 352.

In one embodiment, the first message in the present disclosure is generated by the RRC 306.

In one embodiment, the second message in the present disclosure is generated by the MAC 302 or the MAC 352.

In one embodiment, the second message in the present disclosure is generated by the RRC 306.

In one embodiment, the third message in the present disclosure is generated by the MAC 302 or the MAC 352.

In one embodiment, the third message in the present disclosure is generated by the RRC 306.

In one embodiment, the fourth message in the present disclosure is generated by the MAC 302 or the MAC 352.

In one embodiment, the fourth message in the present disclosure is generated by the RRC 306.

In one embodiment, the first signaling in the present disclosure is generated by the MAC 302 or the MAC 352.

In one embodiment, the first signaling in the present disclosure is generated by the RRC 306.

In one embodiment, the first signaling in the present disclosure is generated by the PHY 301 or the PHY 351.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used to manage a plurality of TRPs.

In one embodiment, the second node is a node used for managing a plurality of cells.

Embodiment 4

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multiantenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multiantenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: first performs a channel measurement respectively on a first reference signal resource set and a second reference signal resource set, the first reference signal resource set comprises at least one reference signal resource, the second reference signal resource set comprises at least one reference signal resource; then as a response to K consecutive out-of-step(s), starts a first timer; and as a response to an expiry of the first timer, transmits a target message; a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

In one embodiment, the first communication device 450 comprises at least one processor and at least one memory, a memory that stores a computer readable instruction program. The computer readable instruction program generates an action when executed by at least one processor. The action includes: first performing a channel measurement respectively on a first reference signal resource set and a second reference signal resource set, the first reference signal resource set comprising at least one reference signal resource, the second reference signal resource set comprising at least one reference signal resource; then as a response to K consecutive out-of-step(s), starting a first timer; and as a response to an expiry of the first timer, transmitting a target message; a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: first transmits reference signals respectively in a first reference signal resource set and a second reference signal resource set, the first reference signal resource set comprises at least one reference signal resource, the second reference signal resource set comprises at least one reference signal resource; then receives a target message; a transmitter of the target message is a first node, the first node performs a channel measurement respectively on a first reference signal resource set and a second reference signal resource set, and a measurement performed on a target reference signal resource set is used to determine the K consecutive out-of-step(s); as a response to the K consecutive out-of-step(s), the first node starts a first timer; and as a response to an expiry of the first timer, the first node transmits a target message; the target reference signal resource set is one of the first reference signal resource set and the second reference signal resource set; only when the target reference signal resource set is the second reference signal resource set, the target message is used to indicate an RRC link failure.

In one embodiment, the second communication device 410 comprises a memory that stores a computer readable instruction program. The computer readable instruction program generates an action when executed by at least one processor. The action includes: first transmitting a reference signal respectively in a first reference signal resource set and a second reference signal resource set, the first reference signal resource set comprising at least one reference signal resource, the second reference signal resource set comprising at least one reference signal resource; then receiving a target message; a transmitter of the target message is a first node, the first node performs a channel measurement respectively on a first reference signal resource set and a second reference signal resource set, and a measurement performed on a target reference signal resource set is used to determine the K consecutive out-of-step(s); as a response to the K consecutive out-of-step(s), the first node starts a first timer; and as a response to an expiry of the first timer, the first node transmits a target message; the target reference signal resource set is one of the first reference signal resource set and the second reference signal resource set; only when the target reference signal resource set is the second reference signal resource set, the target message is used to indicate an RRC link failure.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the receiver 454, the multi-antenna receiving processor 458, the receiving processor 456 and the controller/processor 459 are used to perform a channel measurement respectively on a first reference signal resource set and a second reference signal resource set; and at least first four of the antenna 420, the transmitter 418, the multi-antenna transmitting processor 471, the transmitting processor 416 and the controller/processor 475 are used to transmit a reference signal respectively in a first reference signal resource set and a second reference signal resource set.

In one embodiment, at least first four of the antenna 452, the transmitter, the multi-antenna transmitting processor 457, the transmitting processor 468, and the controller/processor 459 are used to start a first timer as a response to K consecutive out-of-step(s), and transmit a target message as a response to an expiry of the first timer; and at least first four of the antenna 420, the receiver 418, the multi-antenna receiving processor 472, the receiving processor 470 and the controller/processor 475 are used to receive a target message.

In one embodiment, at least first four of the antenna 452, the receiver 454, the multi-antenna receiving processor 458, the receiving processor 456 and the controller/processor 459 are used to receive a first message and a second message; and at least first four of the antenna 420, the transmitter 418, the multi-antenna transmitting processor 471, the transmitting processor 416 and the controller/processor 475 are used to transmit a first message and a second message.

In one embodiment, at least first four of the antenna 452, the receiver 454, the multi-antenna receiving processor 458, the receiving processor 456 and the controller/processor 459 are used to receive a third message and a fourth message; and at least first four of the antenna 420, the transmitter 418, the multi-antenna transmitting processor 471, the transmitting processor 416 and the controller/processor 475 are used to transmit a third message and a fourth message.

In one embodiment, at least first four of the antenna 452, the receiver 454, the multi-antenna receiving processor 458, the receiving processor 456 and the controller/processor 459 are used to receive a first signaling; and at least first four of the antenna 420, the transmitter 418, the multi-antenna transmitting processor 471, the transmitting processor 416 and the controller/processor 475 are used to transmit a first signaling.

Embodiment 5

Embodiment 5 illustrates a flowchart of a target message, as shown in FIG. 5. In FIG. 5, a first node U1 and a second node N2 are in communications via a radio link. It is particularly underlined that the order illustrated in the embodiment does not put constraints over sequences of signal transmissions and implementations.

The first node U1 performs a channel measurement respectively on the first reference signal resource set and the second reference signal resource set in step 10; in step S11 starts a first timer as a response to K consecutive out-of-step(s), and transmits a target message as a response to an expiry of the first timer.

The second node N2 transmits a reference signal respectively in a first reference signal resource set and a second reference signal resource set in step S20; and receives a target message in step S21.

In embodiment 5, the first reference signal resource set comprises at least one reference signal resource, the second reference signal resource set comprises at least one reference signal resource; a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

In one embodiment, a reference signal transmitted in the first reference signal resource set comprises an SSB.

In one embodiment, a reference signal transmitted in the second reference signal resource set comprises an SSB.

In one embodiment, a reference signal transmitted in the first reference signal resource set comprises a CSI-RS.

In one embodiment, a reference signal transmitted in the second reference signal resource set comprises a CSI-RS.

In one embodiment, a reference signal transmitted in the first reference signal resource set comprises a DMRS.

In one embodiment, a reference signal transmitted in the second reference signal resource set comprises a DMRS.

In one embodiment, a reference signal transmitted in the first reference signal resource set comprises a PDCCH.

In one embodiment, a reference signal transmitted in the second reference signal resource set comprises a PDCCH.

In one embodiment, a reference signal transmitted in the first reference signal resource set comprises a Positioning Reference Signal (PRS).

In one embodiment, a reference signal transmitted in the second reference signal resource set comprises a PRS.

In one embodiment, only when the target reference signal resource set is the second reference signal resource set, the target message comprises an RRC-layer signaling.

In one subembodiment of the embodiment, when the target reference signal resource set is the first reference signal resource set, the target message comprises a MAC-layer signaling.

In one subembodiment of the embodiment, when the target reference signal resource set is the first reference signal resource set, the target message comprises a physical-layer signaling.

In one subembodiment of the embodiment, when the target reference signal resource set is the first reference signal resource set, the target message is transmitted through Uplink Control Information (UCI).

In one subembodiment of the embodiment, when the target reference signal resource set is the first reference signal resource set, the target message is transmitted through a Physical Uplink Control Channel (PUCCH).

In one subembodiment of the embodiment, when the target reference signal resource set is the first reference signal resource set, the target message is transmitted through a Physical Uplink Shared Channel (PUSCH).

In one subembodiment of the embodiment, when the target reference signal resource set is the first reference signal resource set, the target message is transmitted through a Physical Random Access Channel (PRACH).

In one subembodiment of the embodiment, when the target reference signal resource set is the first reference signal resource set, the target message is carried through a Scheduling Request (SR).

In one embodiment, any reference signal resource in the first reference signal resource set is associated with a first cell, and any reference signal resource in the second reference signal resource set is associated with a second cell.

In one subembodiment of the embodiment, only the second cell in both the first cell and the second cell is configured as a serving cell of the first node.

In one subembodiment of the embodiment, the first cell corresponds to a Non Serving Cell Physical Cell Identifier.

In one subembodiment of the embodiment, the second cell corresponds to a Serving Cell PCI.

In one subembodiment of the embodiment, the first cell corresponds to a PCI.

In one subembodiment of the embodiment, the second cell corresponds to a PCI.

In one subembodiment of the embodiment, the first cell and the second cell respectively correspond to two different TRPs.

In one subembodiment of the embodiment, the meaning of the above phrase of any reference signal resource in the first reference signal resource set being associated with a first cell includes: any reference signal resource in the first reference signal resource set is transmitted a reference signal by the first cell.

In one subembodiment of the embodiment, the meaning of the above phrase of any reference signal resource in the first reference signal resource set being associated with a first cell includes: a cell identifier of the first cell is used to generate a reference signal transmitted in any reference signal resource in the first reference signal resource set.

In one subembodiment of the embodiment, the meaning of the above phrase of any reference signal resource in the first reference signal resource set being associated with a first cell includes: a reference signal transmitted in any reference signal resource in the first reference signal resource set is quasi co-located with at least one SSB or CSI-RS transmitted by the first cell.

In one subembodiment of the embodiment, the meaning of the above phrase of any reference signal resource in the first reference signal resource set being associated with a first cell includes: a TCI-state of any reference signal resource in the first reference signal resource set is associated with a cell identifier of the first cell.

In one subembodiment of the embodiment, the meaning of the above phrase of any reference signal resource in the first reference signal resource set being associated with a first cell includes: a TCI-stateID of any reference signal resource in the first reference signal resource set is associated with a cell identifier of the first cell.

In one subembodiment of the embodiment, the meaning of the above phrase of any reference signal resource in the first reference signal resource set being associated with a first cell includes: an RRC signaling configuring a TCI-state of any reference signal resource in the first reference signal resource set is also used to indicate a cell identifier of the first cell.

In one subembodiment of the embodiment, the meaning of the above phrase of any reference signal resource in the first reference signal resource set being associated with a first cell includes: an RRC signaling configuring a TCI-stateID of any reference signal resource in the first reference signal resource set is also used to indicate a cell identifier of the first cell.

In one subembodiment of the embodiment, the meaning of the above phrase of any reference signal resource in the first reference signal resource set being associated with a first cell includes: an RRC signaling configuring a QCL relation of any reference signal resource in the first reference signal resource set is also used to indicate a cell identifier of the first cell.

In one subembodiment of the embodiment, the meaning of the above phrase of any reference signal resource in the second reference signal resource set being associated with a second cell includes: any reference signal resource in the second reference signal resource set is transmitted a reference signal by the second cell.

In one subembodiment of the embodiment, the meaning of the above phrase of any reference signal resource in the second reference signal resource set being associated with a second cell includes: a cell identifier of the second cell is used to generate a reference signal transmitted in any reference signal resource in the second reference signal resource set.

In one subembodiment of the embodiment, the meaning of the above phrase of any reference signal resource in the second reference signal resource set being associated with a second cell includes: a reference signal transmitted in any reference signal resource in the second reference signal resource set is quasi co-located with at least one SSB or CSI-RS transmitted by the second cell.

In one subembodiment of the embodiment, the meaning of the above phrase of any reference signal resource in the second reference signal resource set being associated with a second cell includes: a TCI-state of any reference signal resource in the second reference signal resource set is associated with a cell identifier of the second cell.

In one subembodiment of the embodiment, the meaning of the above phrase of any reference signal resource in the second reference signal resource set being associated with a second cell includes: a TCI-stateID of any reference signal resource in the second reference signal resource set is associated with a cell identifier of the second cell.

In one subembodiment of the embodiment, the meaning of the above phrase of any reference signal resource in the second reference signal resource set being associated with a second cell includes: an RRC signaling configuring a TCI-state of any reference signal resource in the second reference signal resource set is also used to indicate a cell identifier of the second cell.

In one subembodiment of the embodiment, the meaning of the above phrase of any reference signal resource in the second reference signal resource set being associated with a second cell includes: an RRC signaling configuring a TCI-stateID of any reference signal resource in the second reference signal resource set is also used to indicate a cell identifier of the second cell.

In one subembodiment of the embodiment, the meaning of the above phrase of any reference signal resource in the second reference signal resource set being associated with a second cell includes: an RRC signaling configuring a QCL relation of any reference signal resource in the second reference signal resource set is also used to indicate a cell identifier of the second cell.

In one subembodiment of the embodiment, the cell identifier of the first cell comprises a PCI.

In one subembodiment of the embodiment, the cell identifier of the first cell comprises a ServingcellId.

In one subembodiment of the embodiment, the cell identifier of the first cell comprises a ServCellIndex.

In one subembodiment of the embodiment, the cell identifier of the first cell comprises a CellGroupId.

In one subembodiment of the embodiment, the cell identifier of the first cell comprises a E-UTRAN Cell Global Identifier (ECGI).

In one subembodiment of the embodiment, the cell identifier of the first cell comprises a E-UTRAN Cell Identifier (ECI).

In one subembodiment of the embodiment, the cell identifier of the first cell comprises a Public Land Mobile Network Identifier (PLMN ID).

In one subembodiment of the embodiment, the cell identifier of the second cell comprises a PCI.

In one subembodiment of the embodiment, the cell identifier of the second cell comprises a ServingcellId.

In one subembodiment of the embodiment, the cell identifier of the second cell comprises a ServCellIndex.

In one subembodiment of the embodiment, the cell identifier of the second cell comprises a CellGroupId.

In one subembodiment of the embodiment, the cell identifier of the second cell comprises an ECGI.

In one subembodiment of the embodiment, the cell identifier of the second cell comprises an ECI.

In one subembodiment of the embodiment, the cell identifier of the second cell comprises a PLMN ID.

In one subembodiment of the embodiment, the cell identifier of the first cell is a non-negative integer.

In one subembodiment of the embodiment, the cell identifier of the second cell is a non-negative integer.

In one subembodiment of the embodiment, the cell identifier of the first cell is different from the cell identifier of the second cell.

In one subembodiment of the embodiment, the first cell is associated with a first control resource set group.

In one subsidiary of the embodiment, the first control resource set group comprises at least one CORESET.

In one subsidiary of the embodiment, the first control resource set group comprises at least one CORESET pool.

In one subsidiary of the embodiment, there at least exists one CORESET being activated in the first control resource set group.

In one subembodiment of the embodiment, the second cell is associated with a second control resource set group.

In one subsidiary of the embodiment, the second control resource set group comprises at least one CORESET.

In one subsidiary of the embodiment, the second control resource set group comprises at least one CORESET pool.

In one subsidiary of the embodiment, there at least exists one CORESET being activated in the second control resource set group.

Embodiment 6

Embodiment 6 illustrates a flowchart of a first message and a second message, as shown in FIG. 6. In FIG. 6, a first node U3 and a second node N4 are in communications via a radio link. It is particularly underlined that the order illustrated in the embodiment does not put constraints over sequences of signal transmissions and implementations.

The first node U3 receives a first message and a second message in step S30;

the second node N4 transmits a first message and a second message in step S40.

In embodiment 6, the first message and the second message respectively indicate K1 and K2, and K1 and K2 are respectively positive integers; when the target reference signal resource set is the first reference signal resource set, K is K1; and when the target reference signal resource set is the second reference signal resource set, K is K2.

In one embodiment, the step S30 is taken before the step S10 in embodiment 5.

In one embodiment, the step S40 is taken before the step S20 in embodiment 5.

In one embodiment, the first message and the second message are respectively transmitted by the first cell and the second cell.

In one embodiment, the first message and the second message are respectively transmitted by the second cell through unicast and broadcast.

In one embodiment, the first message and the second message are transmitted by the second cell.

In one embodiment, the first message comprises an RLF-TimersAndConstants IE for the first cell.

In one embodiment, the second message comprises an RLF-TimersAndConstants IE for the second cell.

In one embodiment, the first message comprises a SpCell-Config IE for the first cell.

In one embodiment, the second message comprises a SpCellConfig IE for the second cell.

In one embodiment, the first information is carried by an RRC signaling.

In one embodiment, the second message is carried by an RRC signaling.

In one embodiment, K1 is a positive integer greater than 1.

In one embodiment, K2 is a positive integer greater than 1.

Embodiment 7

Embodiment 7 illustrates a flowchart of a third message and a fourth message, as shown in FIG. 7. In FIG. 7, a first node U5 and a second node N6 are in communications via a radio link. It is particularly underlined that the order illustrated in the embodiment does not put constraints over sequences of signal transmissions and implementations.

The first node U5 receives a third message and a fourth message in step S50.

The second node N6 transmits a third message and a fourth message in step S60.

In embodiment 7, the third message and the fourth message respectively indicate a first time length and a second time length; when the target reference signal resource set is the first reference signal resource set, an expiration value of the first timer is the first time length; and when the target reference signal resource set is the second reference signal resource set, an expiration value of the first timer is the second time length.

In one embodiment, the step S50 is taken before the step S30 in embodiment 6.

In one embodiment, the step S60 is taken before the step S40 in embodiment 6.

In one embodiment, the step S50 is taken after the step S30 in embodiment 6.

In one embodiment, the step S60 is taken after the step S40 in embodiment 6.

In one embodiment, the step S50 is taken before the step S10 in embodiment 5.

In one embodiment, the step S60 is taken before the step S20 in embodiment 5.

In one embodiment, both the first message and the third message belong to an RRC signaling.

In one embodiment, the first message and the third message belong to a same RRC Information Element (IE).

In one embodiment, both the second message and the fourth message belong to an RRC signaling.

In one embodiment, both the second message and the fourth message belong to a same RRC IE.

In one embodiment, the first message, the second message, the third message and the fourth message all belong to a same RRC signaling.

In one embodiment, the first message, the second message, the third message and the fourth message all belong to a same RRC IE.

In one embodiment, the third message and the fourth message are respectively transmitted by the first cell and the second cell.

In one embodiment, the third message and the fourth message are respectively unicast and broadcast by the second cell.

In one embodiment, the third message and the fourth message are transmitted by the second cell.

In one embodiment, an expiration value of the first timer is an expiration value of T310 in TS 38.331.

In one embodiment, an expiration value of the first timer is a value of t310 in TS 38.331.

In one embodiment, the third message comprises an RLF-TimersAndConstants IE for the first cell.

In one embodiment, the fourth message comprises an RLF-TimersAndConstants IE for the second cell.

In one embodiment, the third message comprises a SpCellConfig IE for the first cell.

In one embodiment, the fourth message comprises a SpCellConfig IE for the second cell.

In one embodiment, the third information is carried by an RRC signaling.

In one embodiment, the fourth information is carried by an RRC signaling.

In one embodiment, the first time length is measured by ms.

In one embodiment, the second time length is measured by ms.

In one embodiment, the first time length is measured by slot.

In one embodiment, the second time length is measured by slot.

In one embodiment, the first time length is equal to T1, and T1 a positive integer greater than 1.

In one embodiment, the second time length is equal to T2, and T2 a positive integer greater than 1.

Embodiment 8

Embodiment 8 illustrates a schematic diagram of a first signaling, as shown in FIG. 8. In FIG. 8, a first node U7 and a second node N8 are in communications via a radio link. It is particularly underlined that the order illustrated in the embodiment does not put constraints over sequences of signal transmissions and implementations.

The first node U7 receives a first signaling in step S70.

The second node N8 transmits a first signaling in step S80.

In embodiment 8, the first signaling is used to indicate a first time-frequency resource set; the target message is transmitted in the first time-frequency resource set; a demodulation reference signal of a channel occupied by the first signaling and a third reference signal resource are quasi co-located, and the third reference signal resource is different from any reference signal resource comprised in the first reference signal resource set.

In one embodiment, the step S70 is taken before the step S30 in embodiment 6.

In one embodiment, the step S80 is taken before the step S40 in embodiment 6.

In one embodiment, the step S70 is taken before the step S50 in embodiment 6.

In one embodiment, the step S80 is taken before the step S60 in embodiment 6.

In one embodiment, the step S70 is taken after the step S50 in embodiment 6.

In one embodiment, the step S80 is taken after the step S60 in embodiment 6.

In one embodiment, the step S70 is taken before the step S10 in embodiment 5.

In one embodiment, the step S80 is taken before the step S20 in embodiment 5.

In one embodiment, the step S70 is taken after the step S10 in embodiment 5.

In one embodiment, the step S80 is taken after the step S20 in embodiment 5.

In one embodiment, a physical-layer channel occupied by the first signaling comprises a PDCCH.

In one embodiment, the first signaling comprises an RRC signaling.

In one embodiment, the meaning of the above phrase of the third reference signal resource being different from any reference signal resource comprised in the first reference signal resource set includes: a TCI-StateId corresponding to the third reference signal resource is different from a TCI-StateId corresponding to any reference signal resource comprised in the first reference signal resource set.

In one embodiment, the third reference signal resource is different from any reference signal resource comprised in the second reference signal resource set.

In one subembodiment of the embodiment, the meaning of the above phrase of the third reference signal resource being different from any reference signal resource comprised in the second reference signal resource set includes: a TCI-StateId corresponding to the third reference signal resource is different from a TCI-StateId corresponding to any reference signal resource comprised in the first reference signal resource set.

In one embodiment, the first time-frequency resource set occupies a PUCCH resource.

In one embodiment, the first time-frequency resource set occupies more than one RE.

In one embodiment, the third reference signal resource is associated to the first cell and the second cell at the same time.

In one subembodiment of the embodiment, the meaning of the above phrase of the third reference signal resource being associated with the first cell and the second cell at the same time includes: the third reference signal resource is transmitted a reference signal by the first cell, and the third reference signal resource is transmitted a reference signal by the second cell.

In one subembodiment of the embodiment, the meaning of the above phrase of the third reference signal resource being associated with the first cell and the second cell at the same time includes: both a cell identifier of the first cell and a cell identifier of the second cell are used to generate a reference signal transmitted in the third reference signal resource.

In one subembodiment of the embodiment, the meaning of the above phrase of the third reference signal resource being associated with the first cell and the second cell at the same time includes: a reference signal transmitted in the third reference signal resource is QCL with at least one SSB or CSI-RS transmitted by the first cell, and a reference signal transmitted in the third reference signal resource is QCL with at least one SSB or CSI-RS transmitted by the second cell.

In one subembodiment of the embodiment, the meaning of the above phrase of the third reference signal resource being associated with the first cell and the second cell at the same time includes: a TCI-state of the third reference signal resource is associated with a cell identifier of the first cell, and a TCI-state of the third reference signal resource is associated with a cell identifier of the second cell.

In one subembodiment of the embodiment, the meaning of the above phrase of the third reference signal resource being associated with the first cell and the second cell at the same time includes: a TCI-stateId of the third reference signal resource is associated with a cell identifier of the first cell, and a TCI-stateId of the third reference signal resource is associated with a cell identifier of the second cell.

In one subembodiment of the embodiment, the meaning of the above phrase of the third reference signal resource being associated with the first cell and the second cell at the same time includes: an RRC signaling configuring a TCI state of the third reference signal resource is also used to indicate a cell identifier of the first cell and a cell identifier of the second cell.

In one subembodiment of the embodiment, the meaning of the above phrase of the third reference signal resource being associated with the first cell and the second cell at the same time includes: an RRC signaling configuring a TCI-stateId of the third reference signal resource is also used to indicate a cell identifier of the first cell and a cell identifier of the second cell.

In one subembodiment of the embodiment, the meaning of the above phrase of the third reference signal resource being associated with the first cell and the second cell at the same time includes: an RRC signaling configuring a QCL relation of the third reference signal resource is also used to indicate a cell identifier of the first cell and a cell identifier of the second cell.

Embodiment 9

Embodiment 9 illustrates a schematic diagram of a target reference signal resource set, as shown in FIG. 9. In FIG. 9, the target reference signal resource set comprises M candidate reference signal resources, M being a positive integer greater than 1, and the M candidate reference signal resources respectively correspond to M beams in the figure.

In one embodiment, the M candidate reference signal resources respectively correspond to K1 TCIs.

In one embodiment, the M candidate reference signal resources respectively correspond to K1 TCI states.

In one embodiment, the M candidate reference signal resources respectively correspond to K1 TCI-StateIds.

In one embodiment, the M candidate reference signal resources respectively correspond to K1 beamforming vectors.

In one embodiment, the M candidate reference signal resources respectively correspond to K1 spatial Rx parameters.

In one embodiment, the target reference signal resource set is the first reference signal resource set, and M candidate reference signal resources comprised in the target reference signal resource set are M1 candidate reference signal resources comprised in the first reference signal resource set, M being equal to M1.

In one embodiment, the target reference signal resource set is the second reference signal resource set, and M candidate reference signal resources comprised in the target reference signal resource set are M2 candidate reference signal resources comprised in the second reference signal resource set, M being equal to M2.

Embodiment 10

Embodiment 10 illustrates a schematic diagram of a first reference signal resource set and a second reference signal resource set, as shown in FIG. 10. In FIG. 10, the first reference signal resource set comprises M1 candidate reference signal resource(s), and the M1 candidate reference signal resource set(s) corresponds (respectively correspond) to TCI-State #1 to TCI-State #M1; the second reference signal resource set comprises M2 candidate reference signal resource(s), and the M2 candidate reference signal resource set(s) corresponds (respectively correspond) to TCI-State #1 to TCI-State #M2; the TCI-State #1 to the TCI-State #M1 is(are) associated to a first cell; and the TCI-State #1 to the TCI-State #M2 is(are) associated to a second cell.

In one embodiment, the TCI State #1 to the TCI State #M1 corresponds (respectively correspond) to M1 TCI-StateId(s).

In one embodiment, any TCI-StateId in the M1 TCI-StateId(s) is a non-negative integer.

In one embodiment, the TCI State #2 to the TCI State #M2 corresponds (respectively correspond) to M2 TCI-StateId(s).

In one embodiment, any TCI-StateId in the M2 TCI-StateId(s) is a non-negative integer.

In one embodiment, the first reference signal resource set and the second reference signal resource set are respectively associated with two CORESET Pool identifiers.

In one embodiment, the first reference signal resource set and the second reference signal resource set are respectively associated with two TRPs.

In one embodiment, the first reference signal resource set and the second reference signal resource set are respectively associated with two serving cells.

In one embodiment, M1 is a positive integer greater than 1.

In one embodiment, M2 is a positive integer greater than 1.

In one embodiment, M1 is equal to M2.

Embodiment 11

Figure 11:
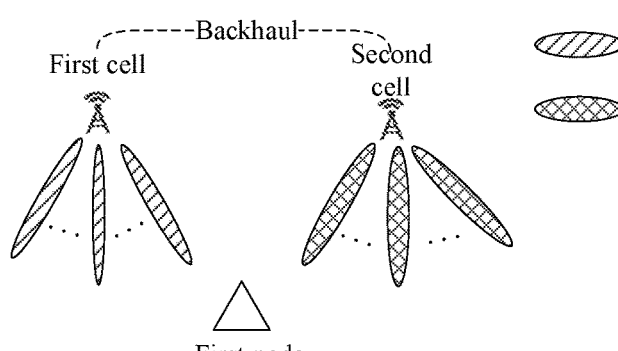
FIG. 11 illustrates a schematic diagram of a first cell and a second cell according to one embodiment of the present disclosure.

Embodiment 11 illustrates a schematic diagram of an application scenario, as shown in FIG. 11. In FIG. 11, the first reference signal resource set and the second reference signal resource set are respectively configured to a first cell and a second cell, the second node controls the first cell and the second cell at the same time, and the first node moves within coverages of the first cell and the second cell.

In one embodiment, the first cell and the second cell respectively adopt two different CORESET Pool Indexes.

In one embodiment, the first cell and the second cell respectively correspond to two TRPs.

In one embodiment, the first cell and the second cell are connected via an X2 interface.

In one embodiment, the first cell and the second cell are connected via an S1 interface.

In one embodiment, there exists an ideal backhaul link between the first cell and the second cell.

In one embodiment, the first cell is a neighbor cell of a serving cell of the first node, and the second cell is a serving cell of the first node.

Embodiment 12

Figure 12:
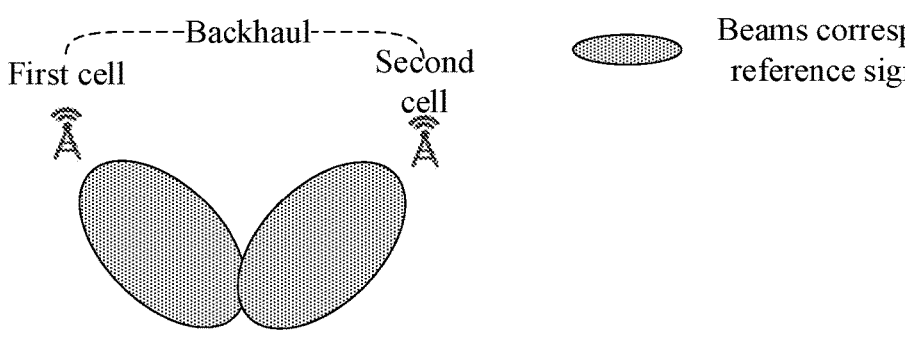
FIG. 12 illustrates a schematic diagram of a third reference signal resource according to one embodiment of the present disclosure.

Embodiment 12 illustrates a schematic diagram of a third reference signal resource, as shown in FIG. 12. In FIG. 12, a first cell and a second cell jointly maintain a beam corresponding to the third reference signal resource, and the third reference signal resource is associated with the first cell and the second cell at the same time.

In one embodiment, the third reference signal resource comprises an SSB.

In one embodiment, the third reference signal resource comprises a CSI-RS.

In one embodiment, the third reference signal resource comprises a PRS.

Embodiment 13

Figure 13:
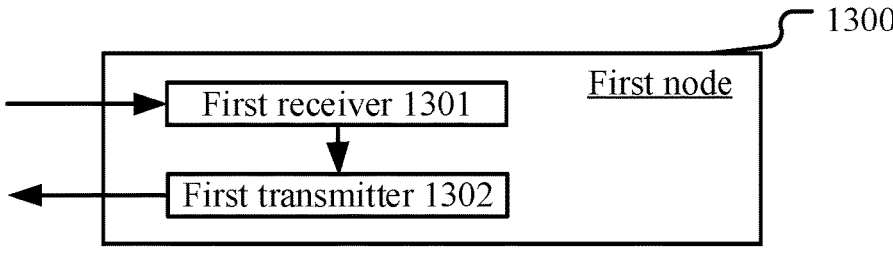
FIG. 13 illustrates a structure block diagram of a processing device in a first node according to one embodiment of the present disclosure.

Embodiment 13 illustrates a structure block diagram in a first node, as shown in FIG. 13. In FIG. 13, a first node 1300 comprises a first receiver 1301 and a first transmitter 1302.

The first receiver 1301 performs a channel measurement respectively on a first reference signal resource set and a second reference signal resource set, the first reference signal resource set comprises at least one reference signal resource, and the second reference signal resource set comprises at least one reference signal resource;

the first transmitter 1302, as a response to K consecutive out-of-step(s), starts a first timer; and as a response to an expiry of the first timer, transmits a target message;

in embodiment 13, a measurement performed on a target reference signal resource set is used to determine the K consecutive out-of-step(s), the target reference signal resource set is one of the first reference signal resource set and the second reference signal resource set; only when the target reference signal resource set is the second reference signal resource set, the target message is used to indicate an RRC link failure.

In one embodiment, only when the target reference signal resource set is the second reference signal resource set, the target message comprises an RRC-layer signaling.

In one embodiment, any reference signal resource in the first reference signal resource set is associated with a first cell, and any reference signal resource in the second reference signal resource set is associated with a second cell.

In one embodiment, the first receiver 1301 receives a first message and a second message; the first message and the second message respectively indicate K1 and K2, and K1 and K2 are respectively positive integers; when the target reference signal resource set is the first reference signal resource set, K is K1; and when the target reference signal resource set is the second reference signal resource set, K is K2.

In one embodiment, the first receiver 1301 receives a third message and a fourth message; the third message and the fourth message respectively indicate a first time length and a second time length; when the target reference signal resource set is the first reference signal resource set, an expiration value of the first timer is the first time length; and when the target reference signal resource set is the second reference signal resource set, an expiration value of the first timer is the second time length.

In one embodiment, the first receiver 1301 receives a first signaling, and the first signaling is used to indicate a first time-frequency resource set; the target message is transmitted in the first time-frequency resource set; a demodulation reference signal of a channel occupied by the first signaling and a third reference signal resource are quasi co-located, and the third reference signal resource is different from any reference signal resource comprised in the first reference signal resource set.

In one embodiment, the third reference signal resource is associated to the first cell and the second cell at the same time.

In one embodiment, the first receiver 1301 comprises at least first four of the antenna 452, the receiver 454, the multi-antenna receiving processor 458, the receiving processor 456 and the controller/processor 459 in embodiment 4.

In one embodiment, the first transmitter 1302 comprises at least the first four of the antenna 452, the transmitter 454, the multi-antenna transmitting processor 457, the transmitting processor 468 and the controller/processor 459 in embodiment 4.

Embodiment 14

Figure 14:
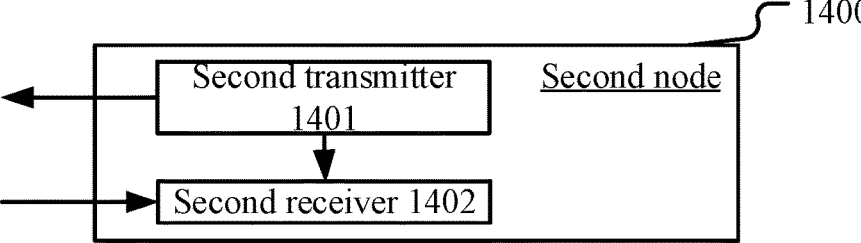
FIG. 14 illustrates a structure block diagram of a processing device in second node according to one embodiment of the present disclosure.

Embodiment 14 illustrates a structure block diagram of in a second node, as shown in FIG. 14. In FIG. 14, a second node 1400 comprises a second transmitter 1401 and a second receiver 1402.

The second transmitter 1401 transmits a reference signal respectively in a first reference signal resource set and a second reference signal resource set, the first reference signal resource set comprises at least one reference signal resource, and the second reference signal resource set comprises at least one reference signal resource; and the second receiver 1402 receives a target message;

In embodiment 14, a transmitter of the target message is a first node, the first node performs a channel measurement respectively on a first reference signal resource set and a second reference signal resource set, and a measurement performed on a target reference signal resource set is used to determine the K consecutive out-of-step(s); as a response to the K consecutive out-of-step(s), the first node starts a first timer; and as a response to an expiry of the first timer, the first node transmits a target message; the target reference signal resource set is one of the first reference signal resource set and the second reference signal resource set; only when the target reference signal resource set is the second reference signal resource set, the target message is used to indicate an RRC link failure.

In one embodiment, only when the target reference signal resource set is the second reference signal resource set, the target message comprises an RRC-layer signaling.

In one embodiment, any reference signal resource in the first reference signal resource set is associated with a first cell, and any reference signal resource in the second reference signal resource set is associated with a second cell.

In one embodiment, the second transmitter 1401 transmits a first message and a second message; the first message and the second message respectively indicate K1 and K2, and K1 and K2 are respectively positive integers; when the target reference signal resource set is the first reference signal resource set, K is K1; and when the target reference signal resource set is the second reference signal resource set, K is K2.

In one embodiment, the second transmitter 1401 transmits a third message and a fourth message; the third message and the fourth message respectively indicate a first time length and a second time length; when the target reference signal resource set is the first reference signal resource set, an expiration value of the first timer is the first time length; and when the target reference signal resource set is the second reference signal resource set, an expiration value of the first timer is the second time length.

In one embodiment, the second transmitter 1402 transmits a first signaling, and the first signaling is used to indicate a first time-frequency resource set; the target message is transmitted in the first time-frequency resource set; a demodulation reference signal of a channel occupied by the first signaling and a third reference signal resource are quasi co-located, and the third reference signal resource is different from any reference signal resource comprised in the first reference signal resource set.

In one embodiment, the third reference signal resource is associated to the first cell and the second cell at the same time.

In one embodiment, the second transmitter 1401 comprises at least first four of the antenna 420, the transmitter 418, the multi-antenna transmitting processor 471, the transmitting processor 414 and the controller/processor 475 in embodiment 4.

In one embodiment, the second receiver 1402 comprises at least the first four of the antenna 420, the receiver 418, the multi-antenna receiving processor 472, the receiving processor 470 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present disclosure includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:

a transceiver; and a processor, operatively coupled to the transceiver;

wherein the transceiver and processor are configured to:

receive configuration information of a first reference signal resource set and a second reference-signal resource set, each including at least one reference signal resource;

determine, based on channel measurements performed on a target reference signal resource set selected from the first and second reference signal resource sets, that K consecutive out-of-sync events have occurred;

responsive to the determination, start a timer; and upon expiry of the timer:

(a) when the timer is kept in a master cell group (MCG):

(i) when Access Stratum (AS) security is not activated, enter an RRC_IDLE state;

(ii) initiate an MCG failure information procedure, or (iii) initiate a connection reestablishment procedure;

(b) when the timer is kept in a Secondary Cell Group (SCG), and only when the target reference signal resource set is the second reference signal resource set, inform a network of a radio link failure associated with the SCG by initiating an SCG failure information process.

2. The UE of claim 1, wherein the channel measurements are performed on RadioLinkMonitoringRS configured for an active downlink bandwidth part.

3. The UE of claim 1, wherein K corresponds to N310 and the timer corresponds to T310.

4. The UE of claim 1, wherein K is set per set such that K=K1when the target reference signal resource set is the first set and K=K2 when the target reference signal resource set is the second set.

5. The UE of claim 1, wherein an "out-of-sync" event is a physical-layer out-of-sync indication provided from lower layers to higher layers.

6. The UE of claim 1, wherein the channel measurements include at least one of a reference signal received power (RSRP) or a synchronization-signal signal-to- interference-plus-noise ratio (SS-SINR) measured on reference signal resources of the target reference signal resource set.

7. The UE of claim 1, wherein any reference signal resource in the first reference signal resource set is associated with a first cell, and any reference signal resource in the second reference signal resource set is associated with a second cell.

8. The UE of claim 1, wherein the first reference signal resource set is associated with a neighbor cell and the second reference signal resource set is associated with a serving cell.

9. The UE of claim 1, wherein the transceiver and processor are further configured to:

upon expiry of the timer, and only when (i) the timer is kept in the SCG and (ii) the target reference signal resource set is the second reference signal resource set, initiate an SCG failure information procedure to indicate a radio link failure associated with the SCG.

10. A method performed by a user equipment (UE), the method comprising:

receiving configuration information of a first reference signal resource set and a second reference signal resource set, the first reference signal resource set including at least one reference signal resource, the second reference signal resource set including at least one reference signal resource;

determining, based on channel measurements performed on a target reference signal resource set selected from the first and second reference signal resource sets, that K consecutive out-of-sync events have occurred;

responsive to the determination, starting a timer, wherein the timer is kept in a master cell group (MCG); and upon expiry of the timer:

(i) when Access Stratum (AS) security is not activated, enter an RRC_IDLE state;

(ii) initiate an MCG failure information procedure, or (iii) initiate a connection reestablishment procedure.

11. The method of claim 10, wherein the channel measurements are performed on RadioLinkMonitoringRS configured for an active downlink bandwidth part.

12. The method of claim 10, wherein K corresponds to N310 and the timer corresponds to T310.

13. The method of claim 10, wherein K is set per set such that K=K1 when the target reference signal resource set is the first set and K =K2 when the target reference signal resource set is the second set.

14. The method of claim 10, wherein an "out-of-sync" event is a physical-layer out-of-sync indication provided from lower layers to higher layers.

15. The method of claim 10, wherein the channel measurements include at least one of a reference signal received power (RSRP) or a synchronization-signal signal-to-interference-plus-noise ratio (SS-SINR) measured on reference signal resources of the target reference signal resource set.

16. The method of claim 10, wherein any reference signal resource in the first reference signal resource set is associated with a first cell, and any reference signal resource in the second reference signal resource set is associated with a second cell.

17. The method of claim 10, wherein the first reference signal resource set is associated with a neighbor cell and the second reference signal resource set is associated with a serving cell.

18. A method performed by a user equipment (UE), the method comprising:

receiving configuration information of a first reference signal resource set and a second reference signal resource set, the first reference signal resource set including at least one reference signal resource, the second reference signal resource set including at least one reference signal resource;

determining, based on channel measurements performed on a target reference signal resource set selected from the first and second reference signal resource sets, that K consecutive out-of-sync events have occurred;

responsive to the determination, starting a timer, wherein the timer is kept in a secondary cell group (SCG); and upon expiry of the timer, informing a network of a radio link failure associated with the SCG by initiating an SCG failure information process.

19. The method of claim 18, wherein K corresponds to N310 and the timer corresponds to T310.

20. The method of claim 18, wherein K is set per set such that K =K1 when the target reference signal resource set is the first set and K =K2 when the target reference signal resource set is the second set.

\* \* \* \* \*